United States Patent
Kopansky et al.

(10) Patent No.: US 11,268,844 B2
(45) Date of Patent: Mar. 8, 2022

(54) CONTINUOUS ELECTRO-OPTIC FLUID LEVEL SENSOR COMPRISING PLURAL LIGHT DETECTORS OPPOSITELY DISPOSED AT THE SECOND END PORTION OF A BODY

(71) Applicants: Gregory Kopansky, Philadelphia, PA (US); George P. Birch, Turnersville, NJ (US); William C. Quaile, West Chester, PA (US); David A. Weiser, Philadelphia, PA (US); Thomas C. Gross, Honey Brook, PA (US)

(72) Inventors: Gregory Kopansky, Philadelphia, PA (US); George P. Birch, Turnersville, NJ (US); William C. Quaile, West Chester, PA (US); David A. Weiser, Philadelphia, PA (US); Thomas C. Gross, Honey Brook, PA (US)

(73) Assignee: Eaton Intelligent Power Limited, Dublin (IE)

( * ) Notice: Subject to any disclaimer, the term of this patent is extended or adjusted under 35 U.S.C. 154(b) by 353 days.

(21) Appl. No.: 16/600,861

(22) Filed: Oct. 14, 2019

(65) Prior Publication Data
US 2020/0116544 A1    Apr. 16, 2020

Related U.S. Application Data

(60) Provisional application No. 62/746,013, filed on Oct. 16, 2018.

(51) Int. Cl.
*G01F 23/292* (2006.01)
*G01F 23/80* (2022.01)

(52) U.S. Cl.
CPC ............ *G01F 23/292* (2013.01); *G01F 23/80* (2022.01)

(58) Field of Classification Search
CPC .... G01F 23/282; G01F 23/284; G01F 23/292; G01F 23/0007; B60K 15/03; B60K 2015/032
USPC .............................. 250/227.25, 221, 227.14
See application file for complete search history.

(56) References Cited

U.S. PATENT DOCUMENTS

| | | | |
|---|---|---|---|
| 4,443,699 A | 4/1984 | Keller | |
| 4,762,420 A | 8/1988 | Bewley | |
| 4,778,990 A * | 10/1988 | Laughlin | G01J 1/04 250/227.28 |
| 5,073,720 A | 12/1991 | Brown | |
| 5,303,586 A | 4/1994 | Zhao et al. | |
| 5,534,708 A | 7/1996 | Ellinger et al. | |
| 6,668,645 B1 | 12/2003 | Gilmour et al. | |
| 6,925,871 B2 | 8/2005 | Frank | |
| 8,058,635 B2 | 11/2011 | Cierullies et al. | |

(Continued)

FOREIGN PATENT DOCUMENTS

| | | |
|---|---|---|
| DE | 102006014277 | 9/2007 |
| DE | 102009050198 | 4/2011 |

*Primary Examiner* — Que Tan Le
(74) *Attorney, Agent, or Firm* — Eaton Intelligent Power Limited; Jarett D. Millar (57) ABSTRACT

An electro-optic fluid level sensor includes a body having a first end portion and an oppositely disposed second end portion. A light source is disposed at the first end portion of the body. A first light detector is disposed at the second end portion of the body. A second light detector is disposed at the second end portion of the body. The second light detector is axially offset from the first light detector.

20 Claims, 5 Drawing Sheets

(56) References Cited

U.S. PATENT DOCUMENTS

| | | |
|---|---|---|
| 10,222,251 B2 | 3/2019 | Kopansky et al. |
| 10,371,559 B2 | 8/2019 | Truong et al. |
| 2018/0031407 A1 | 2/2018 | Kopansky et al. |

* cited by examiner

CONTINUOUS ELECTRO-OPTIC FLUID LEVEL SENSOR COMPRISING PLURAL LIGHT DETECTORS OPPOSITELY DISPOSED AT THE SECOND END PORTION OF A BODY

CROSS-REFERENCE TO RELATED APPLICATION

The present application claims priority to U.S. Patent Application Ser. No. 62/746,013, entitled "Electro-Optic Fluid Level Sensor" and filed on Oct. 16, 2018. The disclosure of which is hereby incorporated by reference in its entirety.

BACKGROUND

Numerous components in numerous different fields are dependent on the presence or absence of liquid, or a certain amount of liquid. Sensors have been developed for detecting the presence of fluid. One type of sensor is a single-point electro-optic sensor. The single-point electro-optic sensor includes a light source, a light detector, and a refractor (e.g., a prism). While single-point electro-optic sensors are accurate for determining when a fluid level reaches a specific point, single-point electro-optic sensors cannot provide continuous fluid level measurement. Another type of sensor is a multi-point electro-optic sensor. Multi-point electro-optic sensors can include multiple light sources and multiple light detectors disposed along a sensor body. However, these sensors also only determine when a fluid level reaches specific points. Therefore, there is a desire to provide an electro-optic sensor that is capable of continuous fluid level measurement.

SUMMARY

One aspect of the present disclosure relates to an electro-optic fluid level sensor. The electro-optic fluid level sensor includes a body having a first end portion and an oppositely disposed second end portion. The body defines a central bore and a central longitudinal axis. A light source is disposed at the first end portion of the body. A first light detector is disposed at the second end portion of the body. A second light detector is disposed at the second end portion of the body. The second light detector is offset from the first light detector in a direction that is parallel to the central longitudinal axis.

Another aspect of the present disclosure relates to an electro-optic continuous fluid level sensor. The electro-optic continuous fluid level sensor includes a body having a first end portion and an oppositely disposed second end portion. The body defines a central bore and a central longitudinal axis. The central bore is adapted to receive a fluid. A light source is disposed at the first end portion of the body. The light source is aligned with the central longitudinal axis. The light source emits light in a direction that is generally parallel with the central longitudinal axis. A light detector assembly is disposed at the second end portion of the body. The light detector assembly is adapted to receive light emitted from the light source. The light detector assembly includes a first light detector and a second light detector. The second light detector is axially offset from the first light detector in a direction that is generally parallel with the central longitudinal axis.

Another aspect of the present disclosure relates to a method for sensing a fluid level in a fluid chamber. The method comprises the steps of emitting light from a light source disposed in an electro-optic fluid level sensor. The light is received at a first light detector of the electro-optic fluid level sensor. The first light detector outputs a first output that is proportional to an amount of light the first light detector receives. The light is received at a second light detector of the electro-optic fluid level sensor. The second light detector is axially offset from the first light detector. The second light detector outputs a second output that is proportional to an amount of light the second light detector receives. The height of a fluid relative to the first light detector is computed. The height of the fluid computation is a mathematical function of a distance of the axial offset and the first and second outputs.

Another aspect of the present disclosure relates to a method for sensing a fluid level in a fluid chamber. The method comprises the steps of emitting light from a first light source disposed in an electro-optic fluid level sensor. The light is received at a light detector of the electro-optic fluid level sensor. The light detector outputs a first output that is proportional to an amount of light the light detector receives from the first light source. Light is emitted from a second light source. The second light source is axially offset a distance from the first light source. The light from the second light source is received at the light detector of the electro-optic fluid level sensor. The light detector outputs a second output that is proportional to an amount of light the light detector receives from the second light source. The height of a fluid is calculated. The height of the fluid calculation is based on a mathematical function of a distance of the axial offset and the first and second outputs.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
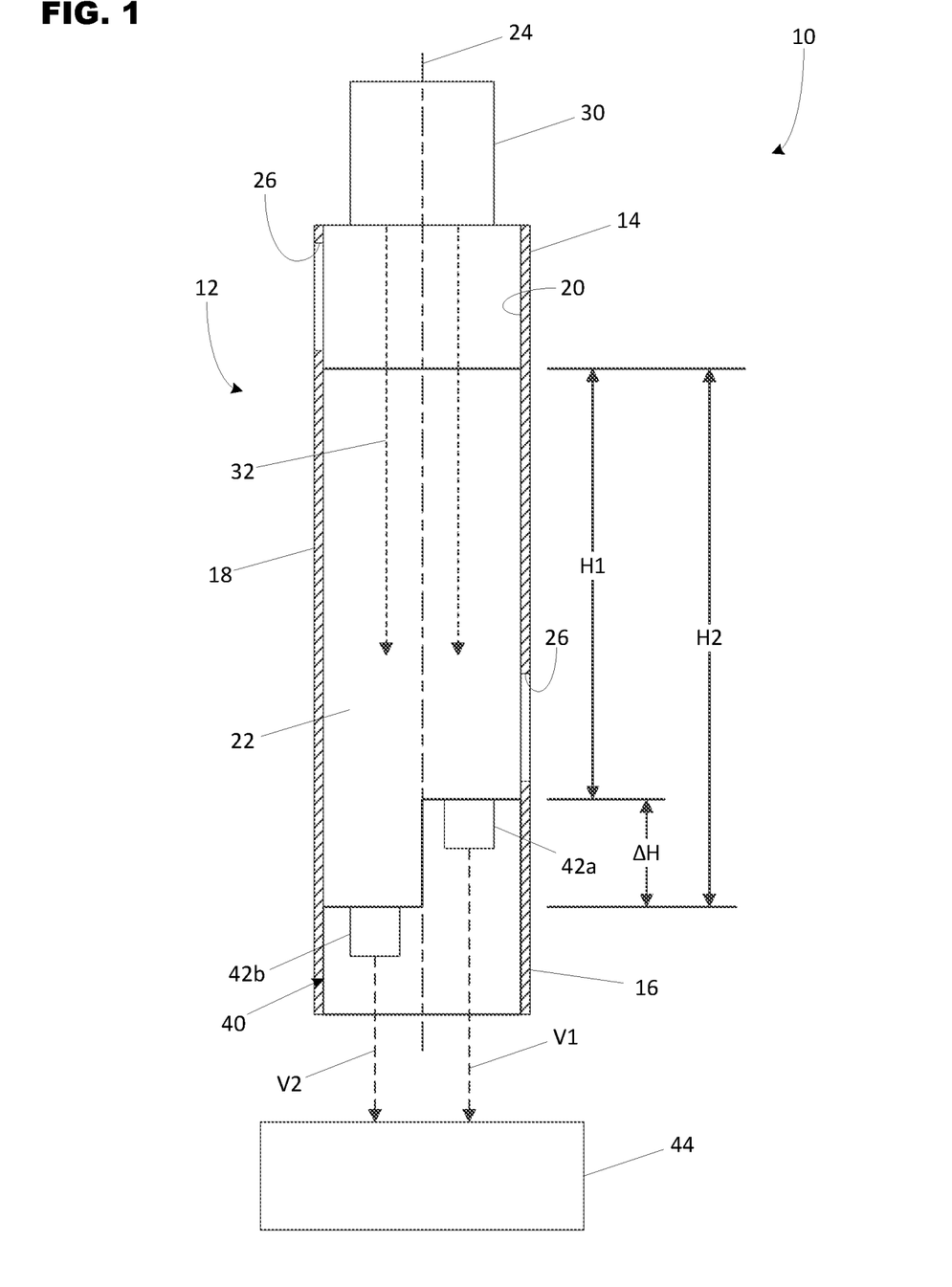
FIG. 1 is a schematic representation of an electro-optic fluid level sensor having exemplary features of aspects in accordance with the principles of the present disclosure.

Referring now to FIG. 1, an electro-optic fluid level sensor 10 is shown. The electro-optic fluid level sensor 10 is adapted to measure a continuous level of fluid in a fluid chamber. The electro-optic fluid level sensor 10 includes a body 12 having a first end portion 14 and an oppositely disposed second end portion 16. The body 12 includes an outer surface 18 and an inner surface 20. The inner surface 20 of the body 12 defines a central bore 22. In the depicted embodiment, the central bore 22 defines a central longitudinal axis 24 that extends through the first and second end portions 14, 16 of the body.

The central bore 22 of the body 12 is adapted to receive fluid through an opening 26 defined in the body 12. In the depicted embodiment, the body 12 defines a plurality of openings 26 that extends through the outer and inner surfaces 18, 20 of the body 12.

The electro-optic fluid level sensor 10 includes a light source 30. In one embodiment, the light source 30 is a light-emitting-diode (LED). In another embodiment, the light source 30 is a plurality of LEDs. In the depicted embodiment, the light source 30 is a laser. The light source 30 is disposed at the first end portion 14 of the body 12. The light source 30 is disposed on the body 12 so that the light source 30 emits light 32 into the central bore 22 of the body 12. In the depicted embodiment, the light source 30 emits light 32 in a direction that is generally parallel to the central longitudinal axis 24 of the body 12.

The electro-optic fluid level sensor 10 further includes a light detector assembly 40 that includes a plurality of light detectors 42. In one embodiment, the light detectors 42 are photodiodes. In another embodiment, the light detectors 42 are light detectors adapted to receive light from a fiber optic light source.

In the depicted embodiment of FIG. 1, the electro-optic fluid level sensor 10 includes a first light detector 42a and a second light detector 42b. The first and second light detectors 42a, 42b are disposed on the body 12 at the second end portion 16. The first and second light detectors 42a, 42b are adapted to receive the light 32 emitted from the light source 30 and output first and second outputs, respectively, that are proportionate to the amount or intensity of light 32 received from the light source 30. In the depicted embodiment, the first and second outputs are first and second voltages V1, V2. In an alternate embodiment, the first and second outputs are first and second currents.

The first and second light detectors 42a, 42b are disposed in the second end portion 16 of the body 12. The second light detector 42b is axially offset from the first light detector 42a by a fixed distance ΔH that is measured in a direction that is generally parallel to the central longitudinal axis 24 of the body 12, with the fixed distance ΔH being greater than zero. In the depicted embodiment, the second light detector 42b is disposed at a greater distance from the light source 30 than the first light detector 42a.

The electro-optic fluid level sensor 10 further includes a processing unit 44. The processing unit is adapted to receive the outputs from the first and second light detectors 42a, 42b and calculate the height of the fluid in the fluid chamber.

In operation, the electro-optic fluid level sensor 10 is disposed in a fluid chamber. Fluid in the fluid chamber enters the central bore 22 of the electro-optic fluid level sensor 10 through the opening 26 in the body 12. The light source 30 emits light 32 that passes through the fluid in the central bore 22 and is received at the first and second light detectors 42a, 42b. The amount of light 32 received by the first and second light detectors 42a, 42b is dependent on the amount of fluid in the central bore 22 of the electro-optic fluid level sensor 10. As the amount of fluid in the central bore 22 increases, the amount or intensity of light received at the first and second light detectors 42a, 42b decreases. As a result, the first and second voltages V1, V2 change as the amount of fluid in the central bore 22 changes.

In one embodiment, as the height of the fluid in the central bore 22 of the body 12 of the electro-optic fluid level sensor 10 increases, the amount of light detected by the first and second light detectors 42a, 42b decreases. The height of the fluid in the central bore 22 of the body 12 of the electro-optic fluid level sensor 10 can be calculated using a mathematical function of the axial offset between the first and second light detectors 42a, 42b and the first and second voltages V1, V2 from the first and second light detectors 42a, 42b. In one embodiment, this mathematical function is linear. As the amount of light detected by the first and second light detectors 42a, 42b decreases, the first and second voltages V1, V2 decrease proportionally. In another embodiment, this mathematical function is logarithmic.

As the Beer-Lambert Law provides that the absorbance of light in a solution is directly proportional to the length of the light path through the solution, the calculation of the height of the fluid in the body 12 of the electro-optic fluid level sensor 10 will be described herein as being a linear mathematical function for ease of description purposes. It will be understood, however, that the present disclosure is not limited to the mathematical function being linear.

In the present example, the processing unit 44 can calculate the height H1 of the fluid relative to the first light detector 40a using the following equation: $H1=m*V1$, where H1 is the height of the fluid relative to the first light detector 42a, V1 is the first voltage from the first light detector 40a and m is a constant equal to the change in height over the change in voltage.

As the electro-optic fluid level sensor 10 has first and second light detectors 42a, 42b, the constant m can be calculated using the following equation: $m=\Delta H/\Delta V$ where ΔH is the fixed distance ΔH between the second and first light detectors 42b, 42a ($\Delta H=H2-H1$) and ΔV is the change in the first voltage V1 from the first light detector 42a and the second voltage V2 of the second light detector 40b ($\Delta V=V1-V2$). As the first and second voltages V1 and V2 are known from the first and second light detectors 40a, 40b and the fixed distance ΔH is known, the H1 value can be calculated.

Figure 2:
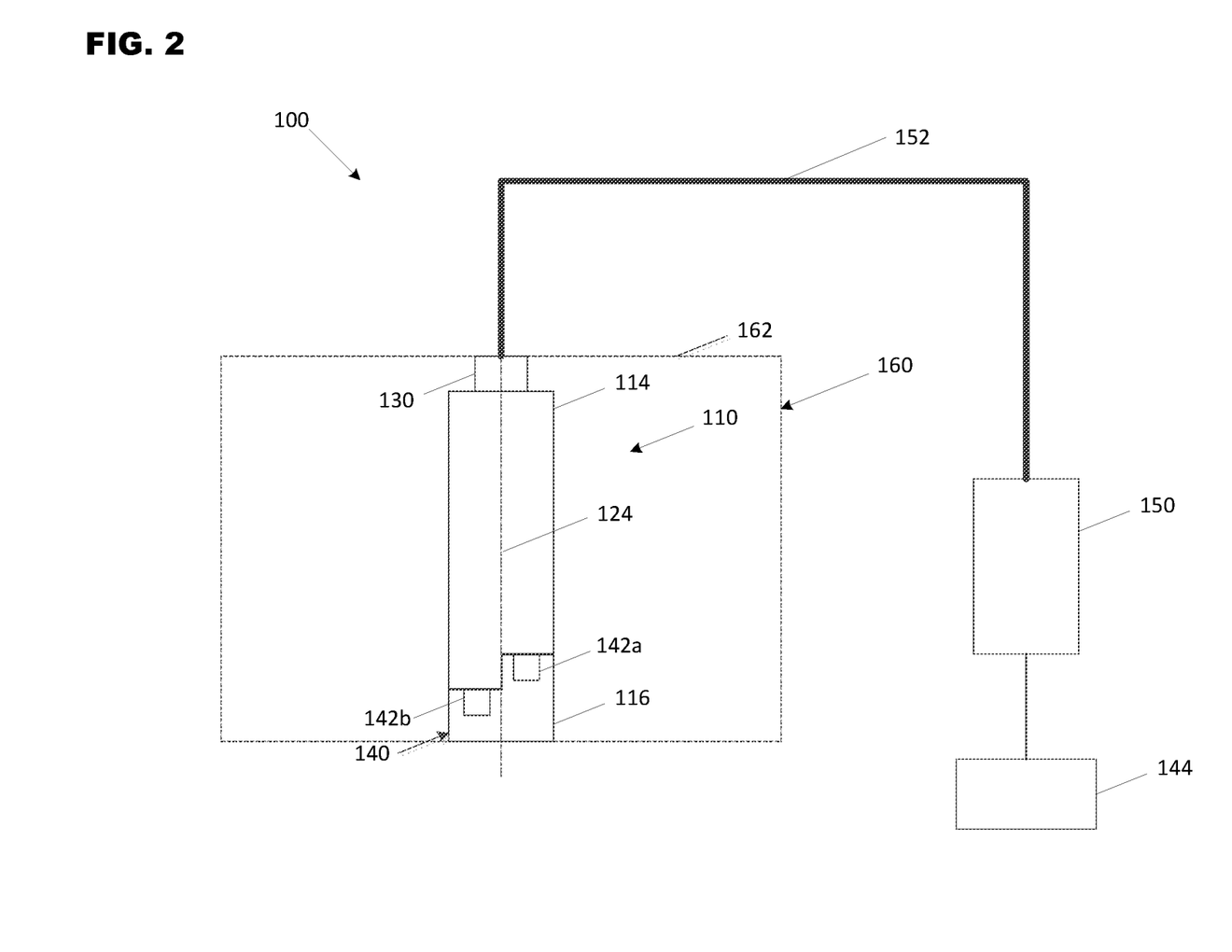
FIG. 2 is a schematic representation of an electro-optic fluid level assembly.

Referring now to FIG. 2, an alternate embodiment of an electro-optic fluid level sensor assembly 100 is shown. The electro-optic fluid level sensor assembly 100 includes an electro-optic fluid level sensor 110. The electro-optic fluid level sensor 110 includes a body 112 having a first end portion 114 and an oppositely disposed second end portion 116. The electro-optic fluid level sensor 110 defines a central longitudinal axis 124 that extends through the first and second end portions 114, 116. The electro-optic fluid level sensor 110 further includes a light source 130 disposed at the first end portion 114 and a light detector assembly 140 disposed at the second end portion 116. In the depicted embodiment, the light source 130 is a laser.

The light detector assembly 140 includes a first light detector 142a and a second light detector 142b. The first and second light detectors 142a, 142b are axial offset so that the first light detector 142a is disposed closer to the light source 130 than the second light detector 142b in a direction that is parallel to the central longitudinal axis 124.

The electro-optic fluid level assembly 100 further includes an electronic module assembly 150. The electronic module assembly 150 is connected to the electro-optic fluid level sensor 110 by a fiber optic cable assembly 152. The fiber optic cable assembly 152 provides a communication pathway between the electro-optic fluid level sensor 110 and the electronic module assembly 150. In one embodiment, the fiber optic cable assembly 152 include a plurality of fiber optic cables and a plurality of fiber optic connectors. The use of fiber optic cable assembly 152 creates an intrinsically safe electro-optic fluid level sensor assembly 100 that would allow the electro-optic fluid level sensor assembly 100 to be used with various fluids, including flammable fluids.

The electro-optic fluid level sensor 110 is disposed in a fluid chamber 160. In the depicted embodiment, the fluid chamber 160 is fuel tank that is adapted to receive a volatile, explosive and/or flammable liquid such as fuel. In the depicted embodiment, the fiber optic cable assembly 152 is connected to the electro-optic fluid level sensor 110 through a wall 162 in the fluid chamber 160. In one embodiment, the connection of the fiber optic cable assembly 152 to the electro-optic fluid level sensor 110 may be through a hermetically sealed connector or a hermetically sealed pass-through.

The electronic module assembly 150 is disposed outside the fluid chamber 160. In one embodiment, the electronic module assembly 150 is disposed a safe distance from the fluid chamber 160. The electronic module assembly 150 is adapted to receive information signals (e.g., amount or intensity of light received at the first and second light detectors 142a, 142b) from the electro-optic light sensor 110 through the fiber optic cable assembly 152. In the depicted embodiment, the electronic module assembly 150 is in communication with a processing unit 144.

Figure 3:
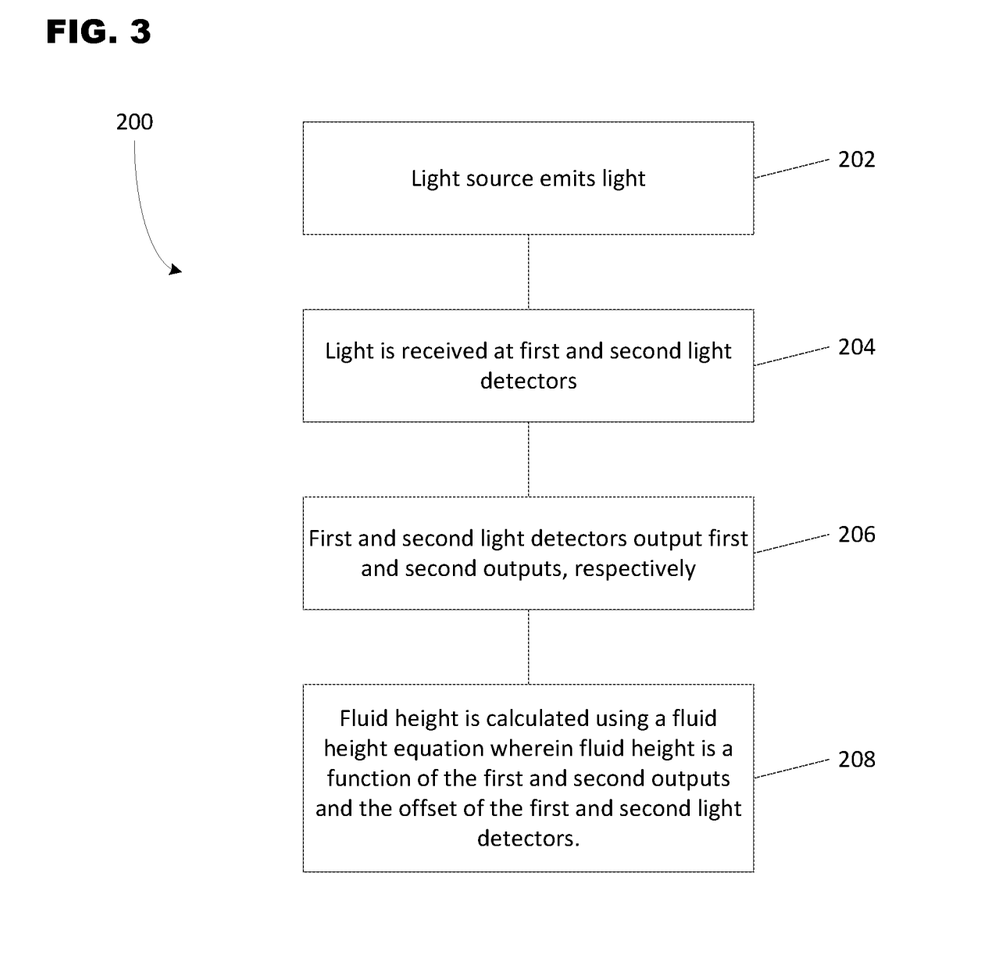
FIG. 3 is a schematic representation of a method for determining a fluid level.

Referring now to FIGS. 1-3, a method 200 for determining the level of fluid in the electro-optic fluid level sensor 10, 110 will be described. In step 202, the light source 30, 130 disposed in the electro-optic fluid level sensor emits light in a direction that is parallel to the central longitudinal axis 24, 124. In step 204, light is received at the first and second light detectors 42, 142. In step 206, the first light detector 42a, 142a outputs a first output that is proportional to the amount or intensity of light received at the first light detector 42a, 142a. The second light detector 42b, 142b outputs a second output that is proportional to the amount or intensity of light received by the second light detector 42b, 142b. In one embodiment, the first and second outputs are first and second voltages. In step 208, the processing unit 144 computes the height of a fluid in the fluid chamber 160 based on the axial offset of the first and second light detectors 42, 142 and the first and second outputs.

Figure 4:
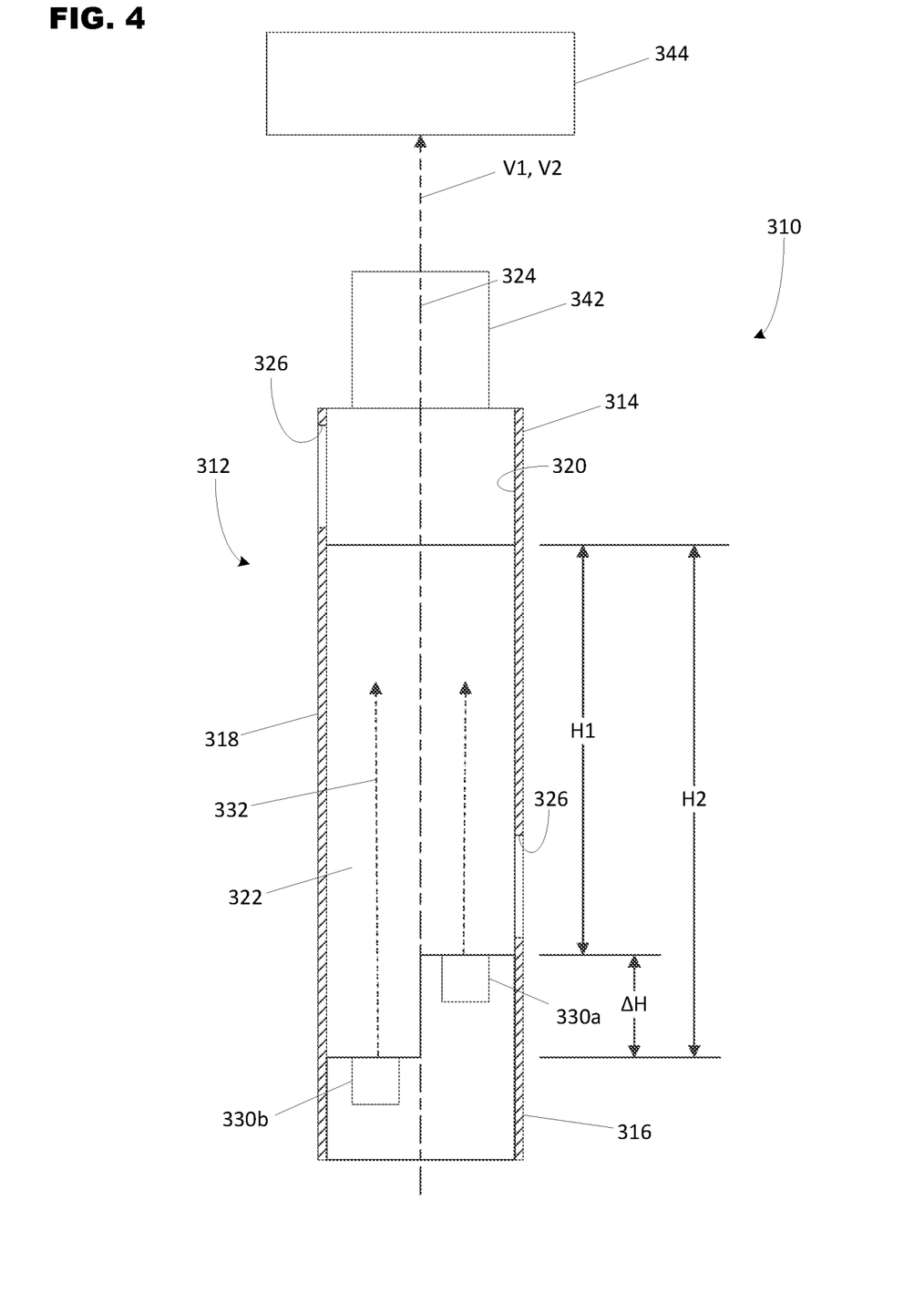
FIG. 4 is a schematic representation of an alternate embodiment of an electro-optic fluid level assembly.

Referring now to FIG. 4, an alternate embodiment of an electro-optic fluid level sensor 310 is shown. The electro-optic fluid level sensor 310 includes a body 312 having a first end portion 314 and an oppositely disposed second end portion 316. The body 312 includes an outer surface 318 and an inner surface 320. The inner surface 320 of the body 312 defines a central bore 322. In the depicted embodiment, the central bore 322 defines a central longitudinal axis 324 that extends through the first and second end portions 314, 316 of the body.

The central bore 322 of the body 312 defines an opening 326 in the body 312. In the depicted embodiment, the body 312 defines a plurality of openings 326 that extends through the outer and inner surfaces 318, 320 of the body 312.

In the depicted embodiment, the electro-optic fluid level sensor 310 includes a first light source 330a and a second light source 330b. In one embodiment, the first and second light sources 330a, 330b are light-emitting-diode (LED). In another embodiment, the first and second light sources 330a, 330b is a plurality of LEDs. In the depicted embodiment, the first and second light sources 330a, 330b are lasers. The first and second light sources 330a, 330b are disposed at the second end portion 316 of the body 312. The first and second light sources 330a, 330b are disposed on the body 312 so that the first and second light sources 330a, 330b emit light 332 into the central bore 322 of the body 312. In the depicted embodiment, the first and second light sources 330a, 330b are positioned on the body 312 to emit light 332 in a direction that is generally parallel to the central longitudinal axis 324 of the body 312. The second light source 330b is axially offset from the first light source 330a by a fixed distance ΔH that is measured in a direction that is generally parallel to the central longitudinal axis 324 of the body 312, with the fixed distance ΔH being greater than zero.

The electro-optic fluid level sensor 310 further includes a light detector assembly 340 that includes a light detector 342. In one embodiment, the light detector 342 is a photodiode. In another embodiment, the light detector 342 is adapted to receive light from a plurality of fiber optic light sources.

In the depicted embodiment of FIG. 4, the electro-optic fluid level sensor 310 includes the light detector 342. The light detector 342 is disposed on the body 312 at the first end portion 314. The light detector 342 is adapted to receive the light 332 emitted from the first and second light sources 330a, 330b and output first and second outputs, respectively, that are proportionate to the amount or intensity of light 332 received from the first and second light sources 330a, 330b. In the depicted embodiment, the first and second outputs are first and second voltages V1, V2. In another embodiment, the first and second outputs are first and second currents. In the depicted embodiment, the light detector 342 is disposed at a greater distance from the second light source 330b than the first light source 330b.

The first and second voltages V1, V2 are transmitted to a processing unit 344. The processing unit 344 calculates the height of the fluid in the central bore 322 of the electro-optic fluid level sensor 310. The height of the fluid in the central bore 322 of the body 312 of the electro-optic fluid level sensor 310 is a function of the axial offset ΔH between the first and second light sources 330a, 330b and the first and second voltages V1, V2 from the light detector 342. In one embodiment, this function is linear. As the amount of light detected by the first and second light detectors 342a, 342b decreases, the first and second voltages V1, V2 decrease proportionally. In another embodiment, this function is logarithmic.

Figure 5:
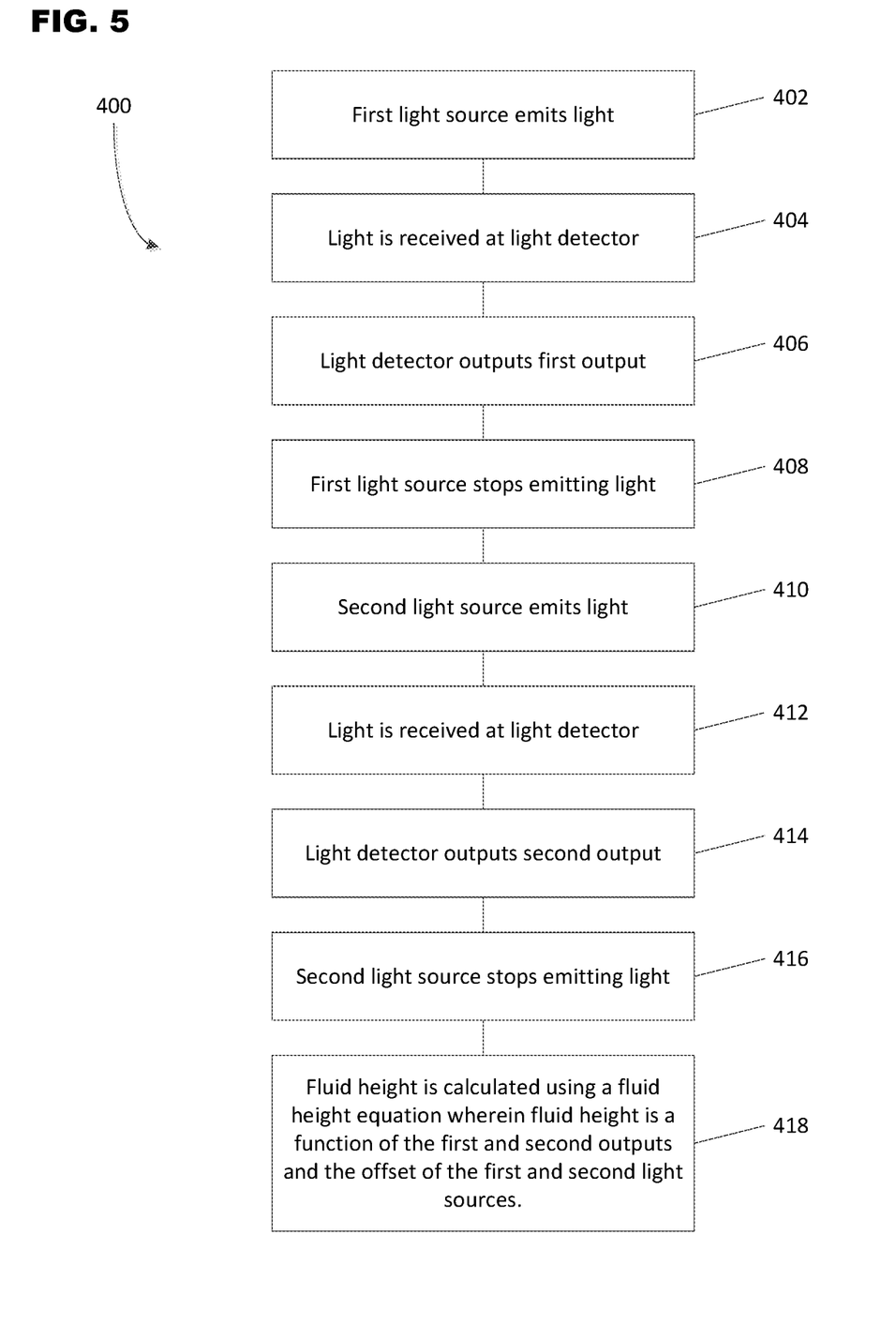
FIG. 5 is a schematic representation of an alternate method for determining a fluid level.

Referring now to FIGS. 4 and 5, a method 400 for determining the level of fluid in the electro-optic fluid level sensor 310 will be described. In step 402, the first light source 330a disposed in the electro-optic fluid level sensor 310 emits light in a direction that is parallel to the central longitudinal axis 324. In step 404, the emitted light from the first light source 330a is received at the light detector 342. In step 406, the light detector 342 outputs a first output that is proportional to the amount or intensity of light from the first light source 330a received at the light detector 342. In step 408, the first light source 330a stops emitting light. In step 410, the second light source 330b emits light in a direction that is parallel to the central longitudinal axis 324 of the electro-optic fluid level sensor 310. In step 412, the emitted light from the second light source 330b is received at the light detector 342. In step 414, the light detector 342 outputs a second output that is proportional to the amount or intensity of light from the second light source 330b received at the light detector 342. In one embodiment, the first and second outputs are first and second voltages. In step 416, the second light source 330b stops emitting light. In step 418, a processing unit computes the height of a fluid in the central bore 322 using a fluid height equation. The fluid height equation is a mathematical function of the axial offset of the first and second light sources 330a, 330b and the first and second outputs. In one embodiment, the fluid height equation is linear. In another embodiment, the fluid height equation is logarithmic.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. An electro-optic fluid level sensor comprising:
   a body having a first end portion and an oppositely disposed second end portion, the body defining a central bore and a central longitudinal axis;
   a light source disposed at the first end portion of the body;
   a first light detector disposed at the second end portion of the body; and
   a second light detector disposed at the second end portion of the body, wherein the second light detector is offset from the first light detector in a direction that is parallel to the central longitudinal axis.

2. The electro-optic fluid level sensor of claim 1, wherein the first light detector outputs a first output that is proportionate to an amount or intensity of light received at the first light detector from the light source.

3. The electro-optic fluid level sensor of claim 2, wherein the second light detector outputs a second output that is proportionate to an amount or intensity of light received at the second light detector from the light source.

4. The electro-optic fluid level sensor of claim 3, wherein the electro-optic fluid level sensor further includes a processing unit.

5. The electro-optic fluid level sensor of claim 4, wherein the processing unit is adapted to calculate a height of fluid in the central bore using a mathematical function of the offset of the first and second light detectors and the first and second outputs.

6. The electro-optic fluid level sensor of claim 5, wherein the mathematical function is linear.

7. An electro-optic continuous fluid level sensor comprising:
   a body having a first end portion and an oppositely disposed second end portion, the body defining a central bore and a central longitudinal axis, the central bore adapted to receive a fluid;
   a light source disposed at the first end portion of the body, the light source being aligned with the central longitudinal axis, wherein the light source emits light in a direction that is generally parallel with the central longitudinal axis;
   a light detector assembly disposed at the second end portion of the body and adapted to receive light emitted from the light source, the light detector assembly including a first light detector and a second light detector, wherein the second light detector is axially offset from the first light detector in a direction that is generally parallel with the central longitudinal axis.

8. The electro-optic continuous fluid level sensor of claim 7, wherein the first light detector outputs a first output that is proportionate to an amount or intensity of light received at the first light detector from the light source.

9. The electro-optic continuous fluid level sensor of claim 8, wherein the second light detector outputs a second output that is proportionate to an amount or intensity of light received at the second light detector from the light source.

10. The electro-optic continuous fluid level sensor of claim 9, wherein the electro-optic fluid level sensor further includes a processing unit.

11. The electro-optic continuous fluid level sensor of claim 10, wherein the processing unit is adapted to calculate a height of fluid in the central bore using a mathematical function of the offset of the first and second light detectors and the first and second outputs.

12. The electro-optic continuous fluid level sensor of claim 11, wherein the mathematical function is logarithmic.

13. A method for determining a fluid level in a fluid chamber, the method comprising the steps of:
   emitting light from a light source disposed in an electro-optic fluid level sensor;
   receiving the light at a first light detector of the electro-optic fluid level sensor, wherein the first light detector outputs a first output that is proportional to an amount of light the first light detector receives;
   receiving the light at a second light detector of the electro-optic fluid level sensor, the second light detector being axially offset a distance from the first light detector, wherein the second light detector outputs a second output that is proportional to an amount of light the second light detector receives; and
   computing a height of a fluid relative to the first light detector, wherein the height of the fluid computation is a mathematical function of a distance of the axial offset and the first and second outputs.

14. A method for determining a fluid level in a fluid chamber as claimed in claim 13, wherein the first output is a first voltage.

15. A method for determining a fluid level in a fluid chamber as claimed in claim 14, wherein the second output is a second voltage.

16. A method for determining a fluid level in a fluid chamber as claimed in claim 13, wherein the mathematical function is linear.

17. A method for determining a fluid level in a fluid chamber, the method comprising the steps of:
   emitting light from a first light source disposed in an electro-optic fluid level sensor;
   receiving the light at a light detector of the electro-optic fluid level sensor, wherein the light detector outputs a first output that is proportional to an amount of light the light detector receives from the first light source;
   emitting light from a second light source disposed in the electro-optic fluid level sensor, wherein the second light source is axially offset a distance from the first light source;
   receiving the light at the light detector, wherein the light detector outputs a second output that is proportional to an amount of light the light detector receives from the second light source;
   calculating a height of a fluid, wherein the height of the fluid calculation is a mathematical function of the distance of the axial offset between the first and second light sources and the first and second outputs.

18. A method for determining a fluid level in a fluid chamber as claimed in claim 17, wherein the first output is a first voltage.

19. A method for determining a fluid level in a fluid chamber as claimed in claim 18, wherein the second output is a second voltage.

20. A method for determining a fluid level in a fluid chamber as claimed in claim 17, wherein the mathematical function is linear.

* * * * *